United States Patent
Nishimura et al.

(10) Patent No.: US 8,192,192 B2
(45) Date of Patent: Jun. 5, 2012

(54) MECHANICAL SAFETY DEVICE FOR AN INJECTION MOLDING MACHINE

(75) Inventors: Koichi Nishimura, Yamanashi (JP); Rui Hikimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 29 days.

(21) Appl. No.: 12/869,794

(22) Filed: Aug. 27, 2010

(65) Prior Publication Data

US 2011/0151043 A1    Jun. 23, 2011

(30) Foreign Application Priority Data

Dec. 21, 2009 (JP) ................. 2009-289610

(51) Int. Cl.
B29C 45/84 (2006.01)
(52) U.S. Cl. ...................... 425/151; 425/153
(58) Field of Classification Search .................. 425/151, 425/153
See application file for complete search history.

(56) References Cited

U.S. PATENT DOCUMENTS

| | | | |
|---|---|---|---|
| 3,728,057 A * | 4/1973 | Grundmann et al. | 425/136 |
| 4,911,630 A * | 3/1990 | Uehara | 425/151 |
| 5,277,568 A * | 1/1994 | Hirata et al. | 425/151 |
| 5,834,036 A * | 11/1998 | Ueno | 425/151 |
| 6,164,947 A * | 12/2000 | Miyahara | 425/136 |

FOREIGN PATENT DOCUMENTS

| | | |
|---|---|---|
| DE | 202004015973 U1 | 12/2004 |
| JP | 56133146 A1 | 10/1981 |
| JP | 63029538 Y2 | 8/1988 |
| JP | 09141716 A1 | 6/1997 |
| JP | 10-113971 A | 5/1998 |
| JP | 11291316 A1 | 10/1999 |
| JP | 2001191384 A1 | 7/2001 |
| JP | 2005225188 A1 | 8/2005 |
| JP | 2010-099938 A1 | 5/2010 |

OTHER PUBLICATIONS

German OA for DE102010037106 mailed Nov. 2, 2011.

* cited by examiner

*Primary Examiner* — Tim Heitbrink
(74) *Attorney, Agent, or Firm* — Lowe Hauptman Ham & Berner LLP

(57) ABSTRACT

A mechanical safety device for an injection molding machine is provided with a laterally openable safety door on the flank of a mold opening/closing portion between a movable platen and a stationary platen. A rod is secured to the stationary platen or a base, and a rail, which ascends and descends as the safety door is closed and opened, is assembled to the rod. The rod is formed with a plurality of engaging step portions and tapered surfaces arranged alternately. On the other hand, a ratchet is rotatably supported on the movable platen. The rail ascends or descends to push up or down the ratchet, thereby locating the ratchet in a position where it engages with the engaging step portions of the rod or a position where it is disengaged from the engaging step portions.

6 Claims, 5 Drawing Sheets

FIG.7 -- Prior-Art --
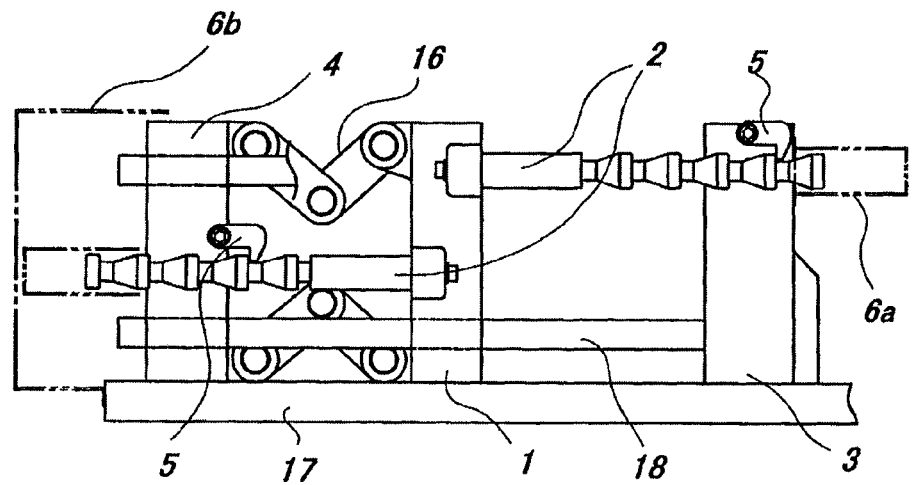
FIG.8 -- Prior-Art --
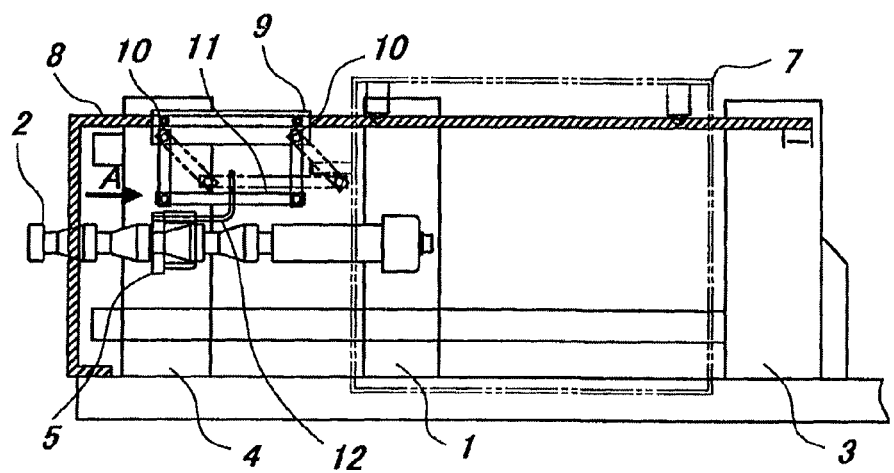

FIG.9  -- Prior-Art --
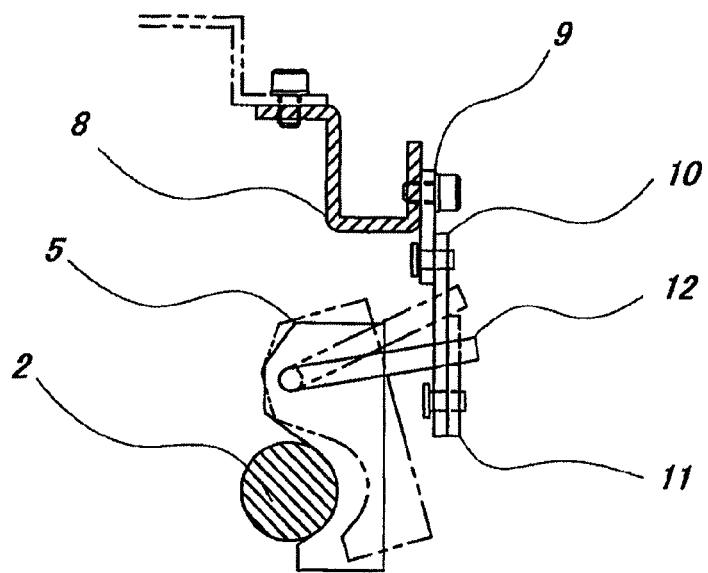
FIG.10  -- Prior-Art --
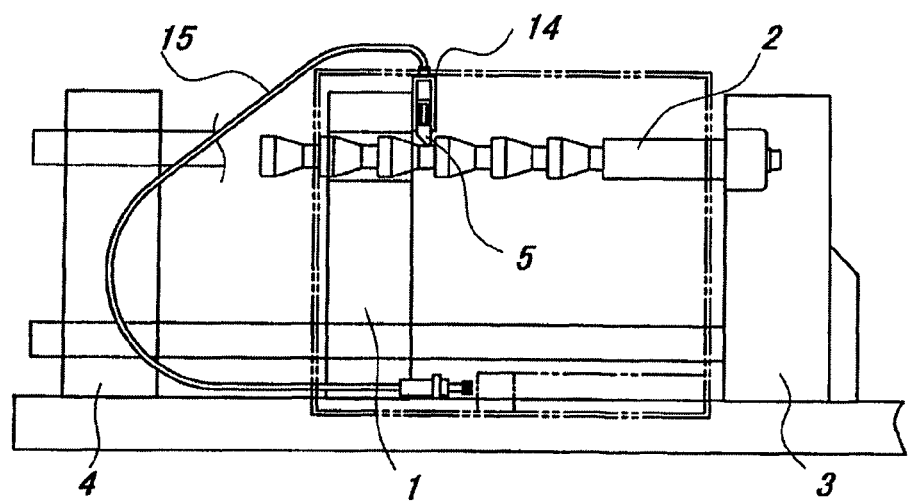

MECHANICAL SAFETY DEVICE FOR AN INJECTION MOLDING MACHINE

RELATED APPLICATIONS

The present application is based on, and claims priority from, Japanese Application Number 2009-289610, filed Dec. 21, 2009, the disclosure of which is hereby incorporated by reference herein in its entirety.

BACKGROUND OF THE INVENTION

1. Field of the Invention

The present invention relates to a mechanical safety device for an injection molding machine.

2. Description of the Related Art

According to a known technique, an injection molding machine in which a stationary platen and a pressure-receiving platen are connected by tie-bars, which penetrate a movable platen for movement between the stationary platen and the pressure-receiving platen, is provided with a safety device. The safety device comprises a laterally openable safety door on the flank of a mold opening/closing portion between the movable platen and the stationary platen. If the safety door is opened, a stopper engages with engaging step portions of a rod, which spans between the movable and stationary platens or between the movable platen and the pressure-receiving platen, in an associated manner, thereby preventing movement of the movable platen.

FIG. 7 is a view illustrating a first example of a mechanical safety device attached to a prior art injection molding machine.

The injection molding machine comprises a movable platen 1, stationary platen 3, and pressure-receiving platen 4 on a base 17, and the stationary platen 3 and the pressure-receiving platen 4 are connected by tie-bars 18, which penetrate the movable platen 1. Guided by the tie-bars 18, the movable platen 1 is movable toward or away from the stationary platen 3. The mechanical safety device used in the injection molding machine comprises a rod 2, formed with engaging step portions and tapered surfaces arranged alternately, and a ratchet 5 capable of engaging with the engaging step portions of the rod 2. One end of the rod 2 is secured to the movable platen 1, the other end is directed horizontally toward the stationary platen 3, and the ratchet 5 on the stationary platen 3 is engageable with the engaging step portions of the rod 2. Alternatively, one end of the rod 2 is secured to the movable platen 1, the other end is directed horizontally toward the pressure-receiving platen 4, and the ratchet 5 on the pressure-receiving platen 4 is engageable with the engaging step portions of the rod 2.

In the case where the rod 2 is secured to the movable platen 1 so as to be directed toward the stationary platen 3, however, it may project forward if the mold is thin. Therefore, a separate cover 6a needs to be provided lest an operator hit the rod 2, so that the working efficiency is reduced, and an increase in costs is entailed. In the case where the rod 2 is secured to the movable platen 1 so as to be directed toward the pressure-receiving platen 4, on the other hand, it may project rearward. Therefore, the rod 2 needs to be located so as not to interfere with components mounted on the pressure-receiving platen 4, so that its place of installation is restricted. If the mold is thick, moreover, a rear cover 6b should be enlarged lest the rod 2 project from the machine.

FIGS. 8 and 9 are views illustrating a second example of a safety device of a mold clamping mechanism of the prior art injection molding machine. This technique is disclosed in Japanese Patent Application Laid-Open No. 10-113971.

As shown in FIG. 8, a rod 2 has its rear end secured to the flank of a movable platen 1 and its distal end portion directed horizontally toward the flank of a pressure-receiving platen 4. The distal end portion of the rod 2 is formed with a required number of engaging step portions and tapered surfaces alternately arranged at regular intervals. A safety door 7 is horizontally movable guided by a guide frame 8, and it serves to open or close the flank of a mold opening/closing portion between the movable platen 1 and a stationary platen 3.

A seat plate 9 is secured to the guide frame 8, two link arms 10 are rotatably mounted on the seat plate 9, and a link bar 11 is connected between the respective distal ends of the link arms 10. When the link arms 10 and the link bar 11 are in positions indicated by full lines in FIG. 8, the safety door 7 is open. Since a lever member 12 is lowered in this state, as indicated by full line in FIG. 9, a ratchet 5 pivots clockwise as in FIG. 9 and engages with the engaging step portions of the rod 2. Thus, movement of the movable platen 1 is prevented. If the safety door 7 is closed, on the other hand, the link arms 10 and the link bar 11 are displaced (or the link bar 11 ascends) as indicated by two-dot chain lines in FIG. 8 as the door 7 moves in its closing direction. As the link bar 11 ascends, the lever member 12 pivots counterclockwise (or upward), as indicated by two-dot chain line in FIG. 9. Thereupon, the ratchet 5 is disengaged from the engaging step portions of the rod 2, as indicated by two-dot chain line in FIG. 9, so that the movement of the movable platen 1 ceases to be prevented.

In the device described in Japanese Patent Application Laid-Open No. 10-113971 mentioned above, it is necessary to secure the seat plate 9 to the guide frame 8 and locate the link bar 11 and the rod 2 under the guide frame 8, so that a vertically wide installation space is needed beside the mold clamping mechanism. Therefore, the interior of the machine cannot be easily accessed during maintenance work. As the downward distance from the guide frame 8 to the rod 2 increases, the seat plate 9 or the link arms 10 are enlarged, so that the maintenance efficiency worsens and the costs increase.

FIG. 10 is a view illustrating a third example of a safety device of a mold clamping mechanism of the prior art injection molding machine. This technique is disclosed in Japanese Utility Model Application Laid-Open No. 58-112518.

One end of a serrated rod 2, which is formed with engaging step portions and tapered surfaces arranged alternately, is secured to a stationary platen 3. The other end of the rod 2 is directed horizontally toward a movable platen 1. The movable platen 1 is provided with a cylinder 14, which contains the ratchet 5 for advance and retreat. The movement of the movable platen 1 can be prevented by operating a wire in a power transmission tube 15, whose distal end is connected to the ratchet 5 in the cylinder 14, to cause the ratchet 5 to project from the cylinder 14 and engage with the engaging step portions of the rod 2.

In the device described in Japanese Utility Model Application Laid-Open No. 58-112518 mentioned above, the sliding resistance of the wire in the power transmission tube 15 due to friction may become too high for the safety device to operate when the tube 15 is bent. Since the end of the power transmission tube 15 advances or retreats together with the movable platen 1, moreover, a mechanism is needed to hold the power transmission tube 15 lest it interfere with a toggle mechanism (not shown) or the door, depending on the variable degree of bending of the power transmission tube 15.

SUMMARY OF THE INVENTION

Accordingly, in consideration of the above-described problems of the prior art techniques, the object of the present invention is to provide a mechanical safety device for an injection molding machine, in which a ratchet is set so as to be freely rotatable relative to a supporting portion secured to a movable platen and is caused to engage with a serrated rod secured to a stationary platen, base, or pressure-receiving platen, whereby advance of the movable platen can be mechanically stopped.

In a first aspect of a mechanical safety device for an injection molding machine according to the present invention, the injection molding machine comprises at least a movable platen and a stationary platen on a base and a mechanism for performing a mold opening/closing operation for the movable platen. The mechanical safety device comprises a laterally openable safety door on the flank of a mold opening/closing portion between the movable platen and the stationary platen. The mechanical safety device further comprises a rod secured to the stationary platen or the base, a rail assembled to the rod and configured to ascend and descend as the safety door is closed and opened, and a ratchet rotatably supported on a prop on the movable platen. The rod is formed with a plurality of engaging step portions and tapered surfaces alternately arranged at regular intervals. The rail is configured to ascend or descend to push up or down the ratchet, thereby locating the ratchet in a position where the ratchet engages with the engaging step portions of the rod or a position where the ratchet is disengaged from the engaging step portions.

The ratchet may be lifted up by the rail, when the safety door is closed, and advance or retreat on the rail during the mold opening/closing operation, lest a mold opening/closing action be suppressed.

The rail may be configured to descend, when the safety door is opened, so that the engaging step portions of the rod engage with the ratchet, thereby suppressing a mold closing action, and the ratchet may be configured to get over the tapered surfaces of the rod lest a mold opening action be prevented.

In a second aspect of the mechanical safety device for an injection molding machine according to the present invention, the injection molding machine comprises a movable platen, a stationary platen, and a pressure-receiving platen on a base and a mechanism for performing a mold opening/closing operation for the movable platen. The mechanical safety device comprises a laterally openable safety door on the flank of a mold opening/closing portion between the movable platen and the stationary platen. The mechanical safety device further comprises a rod secured to the pressure-receiving platen, a rail assembled to the rod and configured to ascend and descend as the safety door is closed and opened, and a ratchet rotatably supported on a prop on the movable platen. The rod is formed with a plurality of engaging step portions and tapered surfaces alternately arranged at regular intervals. The rail is configured to ascend or descend to push up or down the ratchet, thereby locating the ratchet in a position where the ratchet engages with the engaging step portions of the rod or a position where the ratchet is disengaged from the engaging step portions.

The ratchet may be lifted up by the rail, when the safety door is closed, and advance or retreat on the rail during the mold opening/closing operation, lest a mold opening/closing action be suppressed.

The rail may be configured to descend, when the safety door is opened, so that the engaging step portions of the rod engage with the ratchet, thereby suppressing a mold closing action, and the ratchet may be configured to get over the tapered surfaces of the rod lest a mold opening action be prevented.

Based on the consideration of the aforementioned problems of the prior art techniques, the present invention can provide a mechanical safety device for an injection molding machine, in which a ratchet is set so as to be freely rotatable relative to a supporting portion secured to a stationary platen and is caused to engage with a serrated rod secured to a stationary platen, base, or pressure-receiving platen, whereby advance of the movable platen can be mechanically stopped.

BRIEF DESCRIPTION OF THE DRAWINGS

The above and other objects and features of the present invention will be obvious from the ensuing description of embodiments with reference to the accompanying drawings, in which:

FIG. 7 is a view illustrating a first example of a mechanical safety device attached to a prior art injection molding machine;

FIG. 8 is a view illustrating a second example of a safety device of a mold clamping mechanism of the prior art injection molding machine;

FIG. 9 is a sectional view taken along arrow A of FIG. 8; and

FIG. 10 is a view illustrating a third example of a safety device of the mold clamping mechanism of the prior art injection molding machine.

DETAILED DESCRIPTION OF THE PREFERRED EMBODIMENTS

A first embodiment of a mechanical safety device according to the present invention will first be described with reference to FIGS. 1 to 3.

Figure 1:
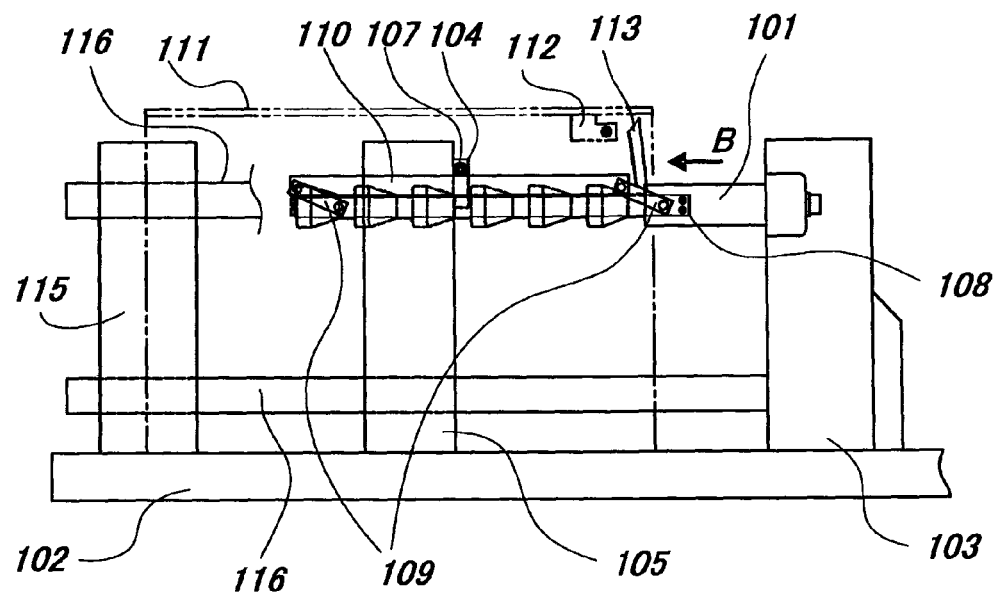
FIG. 1 is a view showing a first embodiment of a mechanical safety device according to the present invention with its safety door open.
Figure 2:
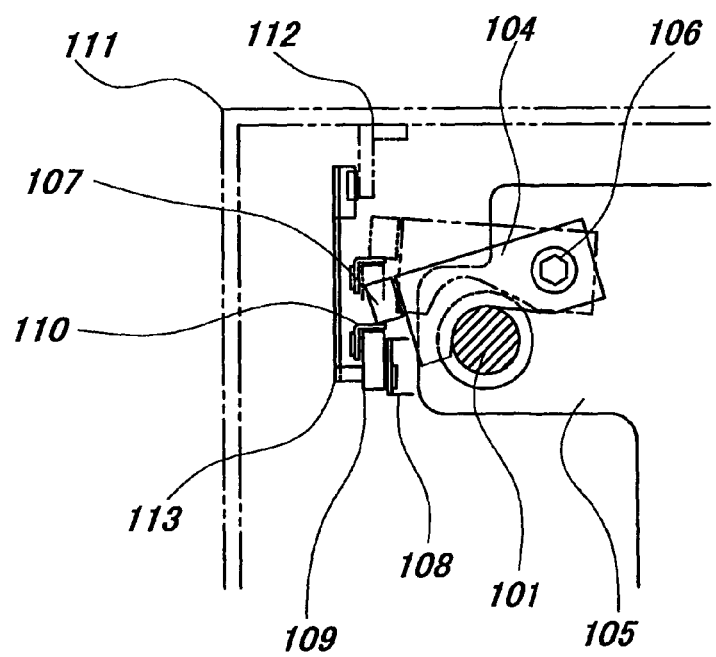
FIG. 2 is a sectional view taken along arrow B of FIG. 1.

As shown in FIG. 1, an injection molding machine with the mechanical safety device comprises a stationary platen 103, pressure-receiving platen 115, tie-bars 116, and movable platen 105. The stationary platen 103 is set on a base 102. The pressure-receiving platen 115 is mounted on the base 102 for longitudinal movement relative to the base 102. The tie-bars 116 connect the stationary platen 103 and the pressure-receiving platen 115. The movable platen 105 is penetrated by the tie-bars 116 and located for movement between the stationary platen 103 and the pressure-receiving platen 115. Further, a toggle mechanism (not shown) for mold clamping is disposed between the movable platen 105 and the pressure-receiving platen 115.

A rod 101 is secured to the stationary platen 103 so as to extend parallel to the tie-bars 116. The rod 101, like the prior art ones previously shown in FIGS. 7, 8 and 10*l*, is formed with a large number of engaging step portions and tapered surfaces alternately arranged at regular intervals, and its cross section is serrated. As shown in FIG. 2, on the other hand, a rotating prop 106 is secured to the movable platen 105, and a hook-like ratchet 104 is rotatably supported on the prop 106. Specifically, the ratchet 104 is freely rotatable around the central axis of the rotating prop 106. As shown in FIG. 2, a wheel 107 is mounted on one end portion of the ratchet 104.

Further, a seat plate 108 is secured to the rod 101, a pair of links 109 are rotatably supported on the seat plate 108, and a rail 110 is connected between the links 109. Specifically, the rail 110 is set on the seat plate 108 of the rod 101 with the aid of the links 109. Furthermore, a cam 113 is secured to one of the links 109.

Figure 3:
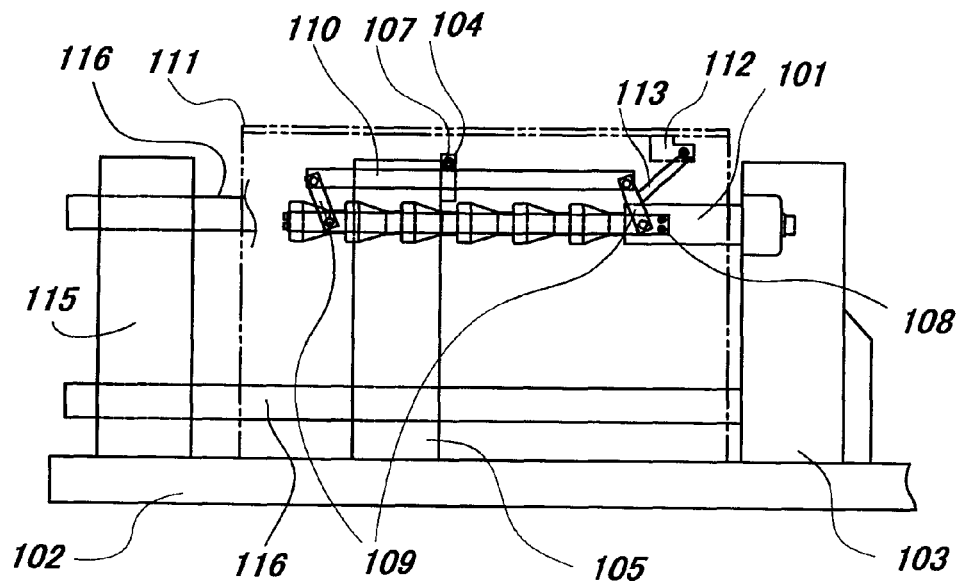
FIG. 3 shows the mechanical safety device of FIG. 1 with its safety door closed.

If a safety door 111 is closed, as shown in FIG. 3, the cam 113 secured to one of the links 109 is pushed and pivoted clockwise by a dog 112 secured to the door 111. As the links 109 then pivot clockwise, the rail 110 is lifted up relative to the base 102. Thereupon, the ratchet 104 pivots around the central axis of the rotating prop 106 and is moved up to a position off the engaging step portions of the rod 101, as indicated by two-dot chain line in FIG. 2.

If the movable platen 105 moves toward or away from the stationary platen 103 in this state, the wheel 107 rolls on the rail 110, so that the movement of the movable platen 105 cannot be prevented by the ratchet 104 that is pivotably secured to the movable platen 105 by the rotating prop 106.

If the safety door 111 is opened, on the other hand, the cam 113 on one of the links 109 ceases to be pushed by the dog 112 any longer, so that the links 109 pivot counterclockwise by their own weight and the rail 110 descends. Thereupon, the ratchet 104 also pivots by its own weight and descends to a position where it engages with the engaging step portions, as indicated by full line in FIG. 2. During a mold opening/closing operation, advance (mold closing action) of the movable platen 105 is suppressed as the engaging step portions of the rod 101 engage with the ratchet 104. Since the ratchet 104 can get over the tapered surfaces adjacent to the engaging step portions, however, retreat (mold opening action) of the movable platen 105 cannot be prevented.

A second embodiment of the mechanical safety device according to the present invention will now be described with reference to FIG. 4.

As in the first embodiment, a rod 101 is secured to the stationary platen 103 so as to extend parallel to the tie-bars 116, a seat plate 108 is secured to the rod 101, links 109 are rotatably supported on the seat plate 108, and a rail 110 is connected between the links 109. In the second embodiment, as shown in FIG. 4, however, a cam 113*a* is pivotably mounted on the stationary platen 103, and a wire rope 114*a* connects the cam 113*a* and one of the links 109.

Figure 4:
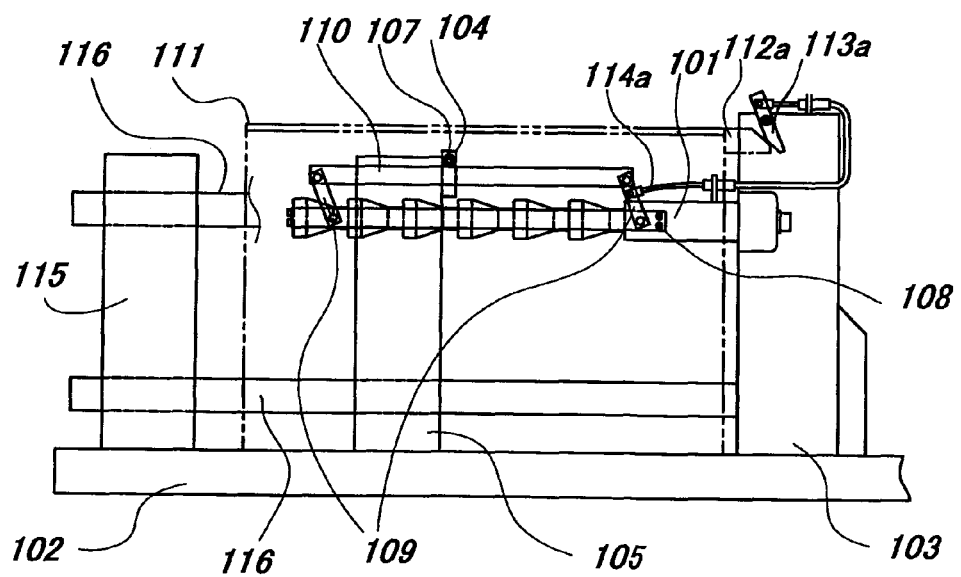
FIG. 4 is a view showing a second embodiment of the mechanical safety device according to the present invention.

If a safety door 111 is closed, as shown in FIG. 4, the cam 113*a* on the stationary platen 103 is pushed by a dog 112*a* secured to the door 111, whereupon it pivots counterclockwise. As the cam 113*a* pivots counterclockwise in this manner, the wire rope 114*a* is pulled to cause the links 109 to pivot clockwise. As the links pivot clockwise in this manner, the rail 110 ascends. Thereupon, the ratchet 104 pivots or ascends to a position off engaging step portions of the rod 101.

If the safety door 111 is opened, on the other hand, the dog 112*a* moves away from the cam 113*a*, so that the links 109 cease to be pulled toward the cam 113*a* by the wire rope 114*a* any longer, and the rail 110 descends by its own weight. Thereupon, the ratchet 104 pivots by its own weight and descends to a position where it engages with the engaging step portions of the rod 101. As the rail 110 descends in this manner, moreover, the wire rope 114*a*, one end of which is connected to one of the links 109, is pulled toward the link 109, whereupon the cam 113*a*, which is connected to the other end of the wire rope 114*a*, pivots clockwise. Since the dog 112*a* is kept away from the cam 113*a*, however, it cannot prevent the clockwise pivoting of the cam 113*a*.

A third embodiment of the mechanical safety device according to the present invention will now be described with reference to FIGS. 5 and 6.

A rod 101 is secured to a pressure-receiving platen 115 so as to extend parallel to tie-bars 116, a seat plate 108 is secured to the rod 101, links 109 are rotatably supported on the seat plate 108, and a rail 110 is connected between the links 109. On the other hand, a cam 113*b* is pivotably mounted on a stationary platen 103, and a wire rope 114*b* connects the cam 113*b* and one of the links 109.

Figure 5:
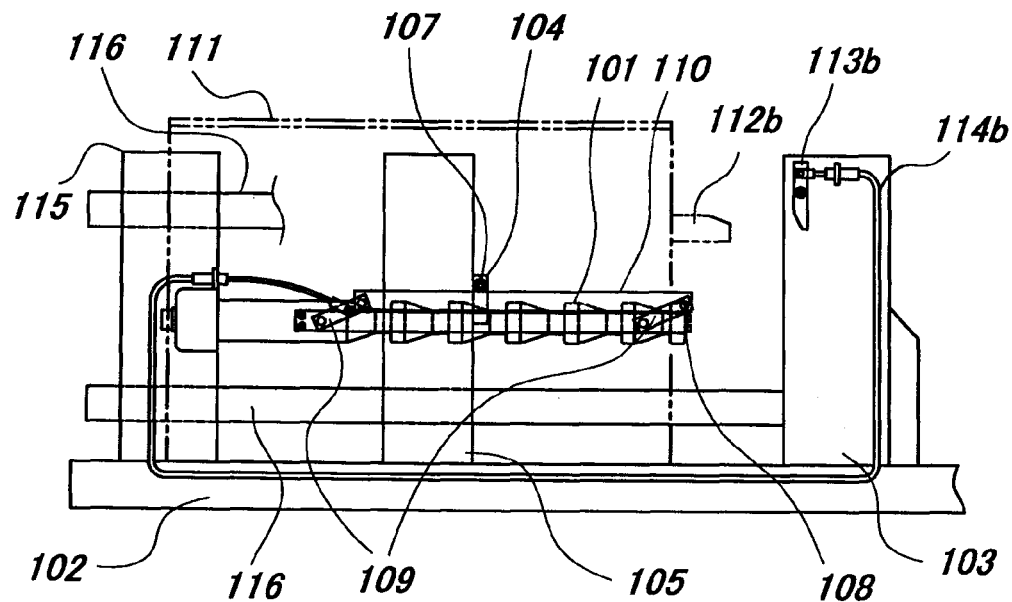
FIG. 5 is a view showing a third embodiment of the mechanical safety device according to the present invention with its safety door open.

FIG. 5 shows a state in which a safety door 111 is open. In this state, the cam 113*b* on the stationary platen 103 is not pushed by a dog 112*b* mounted on the door 111. In other words, the links 109 are not pulled by the wire rope 114*b*. Consequently, the rail 110 descends by its own weight, so that a ratchet 104 also pivots or descends by its own weight and engages with the rod 101.

Figure 6:
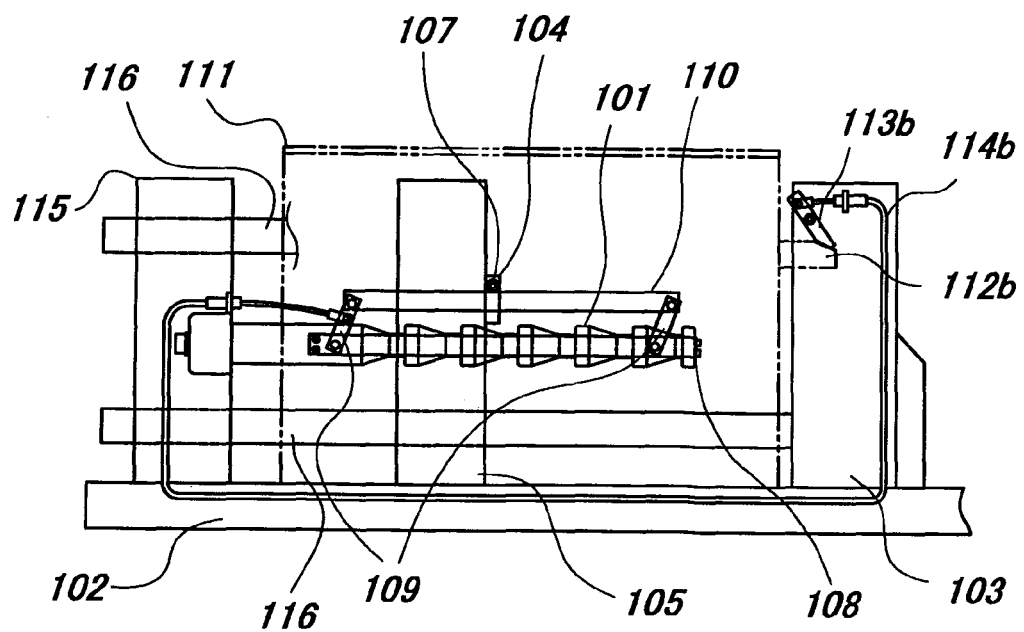
FIG. 6 shows the mechanical safety device of FIG. 5 with its safety door closed.

FIG. 6 shows a state in which a safety door 111 is closed. In this state, the cam 113*b* on the stationary platen 103 is pushed by the dog 112*b* on the door 111. In other words, the links 109 are pulled by the wire rope 114*b*. Consequently, the rail 110 is in a raised position, so that the ratchet 104 is caused to ascend and be separated by the rail 110. Thus, the ratchet 104 is disengaged from engaging step portions of the rod 101.

If the safety door 111 in the closed state shown in FIG. 6 is opened, the dog 112*b* on the safety door 111 leaves the cam 113*b*, as shown in FIG. 5. Thereupon, the rail 110 descends by its own weight, and the links 109 rotate clockwise. Further, the wire rope 114*b*, one end of which is connected to one of the links 109, is pulled toward the link 109, whereupon the cam 113*b*, which is connected to the other end of the rope 114*b*, pivots clockwise. This rotation of the cam 113*b* cannot be prevented by the dog 112*b*, which is kept away from the cam 113*b*.

As mentioned before, the ratchet 104 is rotatably supported on the rotating prop 106 secured to the movable platen 105, and a wheel 107 (see FIG. 2) is mounted on one end portion of the ratchet 104. If the movable platen 105 moves toward or away from the stationary platen 103, therefore, the wheel 107 rolls on the rail 110, so that the ratchet 104 can move smoothly.

As mentioned before, the rod 101 is formed with a large number of engaging step portions and tapered surfaces alternately arranged at regular intervals. If the safety door 111 is opened, the ratchet 104 pivots by its own weight and descends to a position where it engages with the engaging step portions of the rod 101. Consequently, advance (mold closing action) of the movable platen 105 is suppressed. Since the ratchet 104 can get over the tapered surfaces of the rod 101, however, retreat (mold opening action) of the movable platen 105 cannot be prevented.

In this embodiment, one end of the rod 101 is secured to the pressure-receiving platen 115, and the links 109 are pivoted by pulling the wire rope 114*b* as the cam 113*b* is pivoted by the dog 112. By the use of this mechanism, the safety device can be operated even if the relative positions of the pressure-receiving platen 115 and the safety door 111 are changed as the pressure-receiving platen is moved by mold thickness adjustment.

Although the rod 101 is secured to the stationary platen 103 or the pressure-receiving platen 115 in the embodiments described above, it may alternatively be secured to the base 102.

What is claimed is:

1. A mechanical safety device for an injection molding machine, the injection molding machine comprising at least a movable platen and a stationary platen on a base and a mechanism for performing a mold opening/closing operation for the movable platen, the mechanical safety device comprising a laterally openable safety door on the flank of a mold opening/closing portion between the movable platen and the stationary platen, the mechanical safety device further comprising:
   a rod secured to the stationary platen or the base;
   a rail assembled to the rod and configured to ascend and descend as the safety door is closed and opened; and
   a ratchet rotatably supported on a prop on the movable platen, the ratchet being configured to pivot around the central axis of the prop and being moved up when the rail is lifted up relative to the base;
   wherein the rod is formed with a plurality of engaging step portions and tapered surfaces alternately arranged at regular intervals, and
   the rail is configured to ascend or descend to push up or down the ratchet, thereby locating the ratchet in a first position where the ratchet engages with the engaging step portions of the rod or a second position where the ratchet is disengaged from the engaging step portions.

2. The mechanical safety device for an injection molding machine according to claim 1, wherein the ratchet is lifted up by the rail when the safety door is closed and advances or retreats on the rail during the mold opening/closing operation, lest a mold opening/closing action be suppressed.

3. The mechanical safety device for an injection molding machine according to claim 1, wherein, when the safety door is opened, the rail descends so that the engaging step portions of the rod engage with the ratchet, thereby suppressing a mold closing action, and the ratchet gets over the tapered surfaces of the rod lest a mold opening action be prevented.

4. A mechanical safety device for an injection molding machine, the injection molding machine comprising a movable platen, a stationary platen, and a pressure-receiving platen on a base and a mechanism for performing a mold opening/closing operation for the movable platen, the mechanical safety device comprising a laterally openable safety door on the flank of a mold opening/closing portion between the movable platen and the stationary platen, the mechanical safety device further comprising:
   a rod secured to the pressure-receiving platen;
   a rail assembled to the rod and configured to ascend and descend as the safety door is closed and opened; and
   a ratchet rotatably supported on a prop on the movable platen, the ratchet being configured to pivot around the central axis of the prop and being moved up when the rail is lifted up relative to the base;
   wherein the rod is formed with a plurality of engaging step portions and tapered surfaces alternately arranged at regular intervals, and
   the rail is configured to ascend or descend to push up or down the ratchet, thereby locating the ratchet in a first position where the ratchet engages with the engaging step portions of the rod or a second position where the ratchet is disengaged from the engaging step portions.

5. The mechanical safety device for an injection molding machine according to claim 4, wherein the ratchet is lifted up by the rail when the safety door is closed and advances or retreats on the rail during the mold opening/closing operation, lest a mold opening/closing action be suppressed.

6. The mechanical safety device for an injection molding machine according to claim 4, wherein, when the safety door is opened, the rail descends so that the engaging step portions of the rod engage with the ratchet, thereby suppressing a mold closing action, and the ratchet gets over the tapered surfaces of the rod lest a mold opening action be prevented.

\* \* \* \* \*